United States Patent
Gong et al.

(10) Patent No.: US 11,638,071 B2
(45) Date of Patent: Apr. 25, 2023

(54) CAMERA ASSEMBLY AND MONITORING CAMERA

(71) Applicant: Hangzhou Hikvision Digital Technology Co., Ltd., Zhejiang (CN)

(72) Inventors: Qi Gong, Zhejiang (CN); Weimin Ma, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/631,739

(22) PCT Filed: Aug. 14, 2020

(86) PCT No.: PCT/CN2020/109210
§ 371 (c)(1),
(2) Date: Jan. 31, 2022

(87) PCT Pub. No.: WO2021/027927
PCT Pub. Date: Feb. 18, 2021

(65) Prior Publication Data
US 2022/0279131 A1  Sep. 1, 2022

(30) Foreign Application Priority Data

Aug. 14, 2019 (CN) .......................... 201910746982.1

(51) Int. Cl.
*H04N 23/67* (2023.01)
*H04N 23/695* (2023.01)

(52) U.S. Cl.
CPC ......... *H04N 23/675* (2023.01); *H04N 23/695* (2023.01)

(58) Field of Classification Search
CPC ............... H04N 5/232; H04N 5/23299; H04N 5/232127; H04N 5/225
(Continued)

(56) References Cited

U.S. PATENT DOCUMENTS

| 6,215,519 B1 * | 4/2001 | Nayar .................... H04N 7/181 348/E7.086 |
| 6,812,835 B2 * | 11/2004 | Ito .......................... H04N 7/181 348/E7.086 |

(Continued)

FOREIGN PATENT DOCUMENTS

| CN | 103716594 A | 4/2014 |
| CN | 103716595 A | 4/2014 |

(Continued)

*Primary Examiner* — Pritham D Prabhakher
(74) *Attorney, Agent, or Firm* — Bret E. Field; Bozicevic, Field & Francis LLP

(57) ABSTRACT

The present application provides a camera assembly, which comprises a panoramic camera, a PTZ camera, and a processor. The panoramic camera is used to collect wide-angle images of a monitoring scene; the PTZ camera is used to collect narrow-angle images in different directions of the monitoring scene; the processor is configured to superimpose, in response to an instruction input from outside, a polygon frame corresponding to the instruction on the wide-angle image; select, according to a preset mapping table of wide-angle image coordinates and narrow-angle image coordinates, at least two ordinate values on the polygon frame in the wide-angle image, to obtain at least two ordinate values on the narrow-angle image, thereby determining an effective focus value interval of the PTZ camera, so that the PTZ camera performs a focusing operation within the effective focus value interval during a focusing process.

16 Claims, 5 Drawing Sheets

(58) Field of Classification Search
USPC .......................................................... 348/345
See application file for complete search history.

(56) References Cited

U.S. PATENT DOCUMENTS

| | | | | |
|---|---|---|---|---|
| 8,355,046 B2* | 1/2013 | Fujii | ...................... | H04N 7/181 348/143 |
| 8,390,686 B2* | 3/2013 | Tanaka | ............. | G08B 13/19608 348/143 |
| 8,488,001 B2* | 7/2013 | Mohanty | .......... | G08B 13/19643 348/143 |
| 9,124,812 B2* | 9/2015 | Yoo | .................... | H04N 5/23299 |
| 9,313,400 B2* | 4/2016 | Chen | ................ | G08B 13/19689 |
| 9,497,388 B2* | 11/2016 | Huang | ................ | H04N 5/23296 |
| 9,762,864 B2* | 9/2017 | Norland | ........... | G08B 13/19643 |
| 10,585,344 B1* | 3/2020 | Lablans | ............. | H04N 5/23296 |
| 10,848,685 B2* | 11/2020 | Yokomizo | .......... | H04N 5/23296 |
| 11,132,814 B2* | 9/2021 | Suzuki | .................... | H04N 5/247 |
| 11,195,395 B2* | 12/2021 | Goulet | ............. | G08B 13/19632 |
| 2004/0008773 A1* | 1/2004 | Itokawa | ........... | G08B 13/19689 348/E7.086 |
| 2005/0231589 A1* | 10/2005 | Chiang | .................. | H04N 7/181 348/E7.086 |
| 2006/0056056 A1* | 3/2006 | Ahiska | .................. | H04N 7/181 359/690 |
| 2006/0187312 A1* | 8/2006 | Labaziewicz | ........ | H04N 5/2254 348/E5.042 |
| 2006/0209186 A1* | 9/2006 | Iyoda | ................. | H04N 5/23206 348/E5.042 |
| 2010/0002070 A1* | 1/2010 | Ahiska | ............... | H04N 5/23299 348/E7.001 |
| 2010/0141767 A1* | 6/2010 | Mohanty | .......... | G08B 13/19643 348/E5.024 |
| 2011/0310219 A1* | 12/2011 | Kim | .................... | H04N 5/23238 348/36 |
| 2012/0169882 A1* | 7/2012 | Millar | .............. | G08B 13/19608 348/E7.086 |
| 2014/0104376 A1* | 4/2014 | Chen | ........................ | H04N 7/18 348/36 |
| 2014/0160235 A1* | 6/2014 | Norland | .......... | G08B 13/19643 348/37 |
| 2016/0041367 A1 | 2/2016 | Ono et al. | | |
| 2016/0078298 A1 | 3/2016 | Wu et al. | | |
| 2016/0191799 A1 | 6/2016 | Salivar et al. | | |
| 2017/0302860 A1* | 10/2017 | Yokomizo | .......... | H04N 5/23238 |

FOREIGN PATENT DOCUMENTS

| | | |
|---|---|---|
| CN | 104537659 A | 4/2015 |
| CN | 105120242 A | 12/2015 |
| CN | 106060358 A | 10/2016 |
| CN | 106780613 A | 5/2017 |
| CN | 106791377 A | 5/2017 |
| CN | 108234851 A | 6/2018 |
| CN | 108449545 A | 8/2018 |
| CN | 109120883 A | 1/2019 |
| CN | 110022431 A | 7/2019 |
| CN | 110121068 A | 8/2019 |
| JP | 2017038243 A | 2/2017 |

* cited by examiner

CAMERA ASSEMBLY AND MONITORING CAMERA

The present application claims the priority to a Chinese patent application No. 201910746982.1, filed with the China National Intellectual Property Administration on Aug. 14, 2019 and entitled "Camera assembly and monitoring camera", which is incorporated herein by reference in its entirety.

TECHNICAL FIELD

The present application relates to the technical field of monitoring, in particular to a camera assembly and a monitoring camera.

BACKGROUND

In the field of security monitoring, through the mutual linkage between the panoramic camera and the PTZ (Pan, Tilt, Zoom) camera, the monitoring personnel can not only use the panoramic camera to comprehensively monitor the monitoring scene, but also use the PTZ camera to monitor specific objects within the scope of the panoramic camera, such as tracking and zooming. However, it is necessary to perform accurate coordinate conversion between panoramic camera and PTZ camera to accurately perform the linkage operation of panoramic camera and PTZ camera. Therefore, how to realize the coordinate synchronization of panoramic camera and PTZ camera is very important.

SUMMARY

The present application provides a camera assembly and a monitoring camera to overcome the problems of low label accuracy, time-consuming and labor-consuming in the label association process of panoramic camera and PTZ camera.

In a first aspect, a camera assembly provided by the present application includes:

a panoramic camera, including a first lens and a first image sensor, the panoramic camera is used to collect a wide-angle image of a monitoring scene;

a PTZ camera, including a PT pan-tilt, a second lens, and a second image sensor, the second lens is a zoom lens, the PTZ camera is used to collect narrow-angle images in different directions of the monitoring scene, a visual field angle range of the wide-angle image is larger than a visual field angle range of the narrow-angle image;

a processor, configured to: superimpose, in response to an instruction input from outside, a polygon frame corresponding to the instruction on the wide-angle image; select, according to a preset mapping table of wide-angle image coordinates and narrow-angle image coordinates, at least two ordinate values in the polygon frame in the wide-angle image, and calculate at least two ordinate values on the narrow-angle image corresponding to the at least two ordinate values in the polygon frame in the wide-angle image; calculate an effective focus value interval of the PTZ camera based on the at least two ordinate values in the narrow-angle image, so that the PTZ camera performs a focusing operation within the effective focus value interval during a focusing process.

In a second aspect, a monitoring camera provided by the present application includes a panoramic camera lens and a panoramic image sensor connected to each other, a PTZ camera lens and a PTZ image sensor connected to each other, and a processor connected to both the panoramic image sensor and the PTZ image sensor;

the panoramic image sensor is used to collect a panoramic camera picture through the panoramic camera lens;

the PTZ image sensor is used to collect a PTZ camera picture through the PTZ camera lens;

the processor is configured to obtain the panoramic camera picture and the PTZ camera picture, and associate, according to an obtained label instruction, a panoramic focus label line segment in the panoramic camera picture to a same position in the PTZ camera picture.

The embodiments of the present application provides a camera assembly and a monitoring camera, wherein the camera assembly includes: a panoramic camera, a PTZ camera, and a processor. The panoramic camera includes a first lens and a first image sensor, and the panoramic camera is used to collect wide-angle images of a monitoring scene; the PTZ camera includes a PT pan/tilt, a second lens which is a zoom lens and a second image sensor, the PTZ camera is used to collect narrow-angle images in different directions of the monitoring scene, a visual field angle range of the wide-angle images is larger than a visual field angle range of the narrow-angle images; the processor is configured to superimpose, in response to an instruction input from outside, a polygon frame corresponding to the instruction on the wide-angle image; select, according to a preset mapping table of wide-angle image coordinates and narrow-angle image coordinates, at least two ordinate values in the polygon frame in the wide-angle image, and calculate at least two ordinate values on the narrow-angle image corresponding to the at least two ordinate values in the polygon frame in the wide-angle image; calculate an effective focus value interval of the PTZ camera based on the at least two ordinate values in the narrow-angle image, so that the PTZ camera performs a focusing operation within the effective focus value interval during a focusing process. In this technical solution, the camera assembly can automatically calculate the effective focus value interval of the PTZ camera according to the instruction input from outside without manual label, which improves the label accuracy of the PTZ focus label line segment, ensures that the PTZ camera only focuses within the effective focus value interval in the focusing process, and saves manpower and material resources.

BRIEF DESCRIPTION OF THE DRAWINGS

In order to more clearly describe the technical solutions of the disclosure and those of the prior art, drawings used to illustrate the disclosure and the prior art will be briefly described below. It should be understood that the drawings below are illustrated by way of example only. Those of ordinary skill in the art can obtain further drawings based on these drawings without any creative efforts.

DETAILED DESCRIPTION

Figure 1:
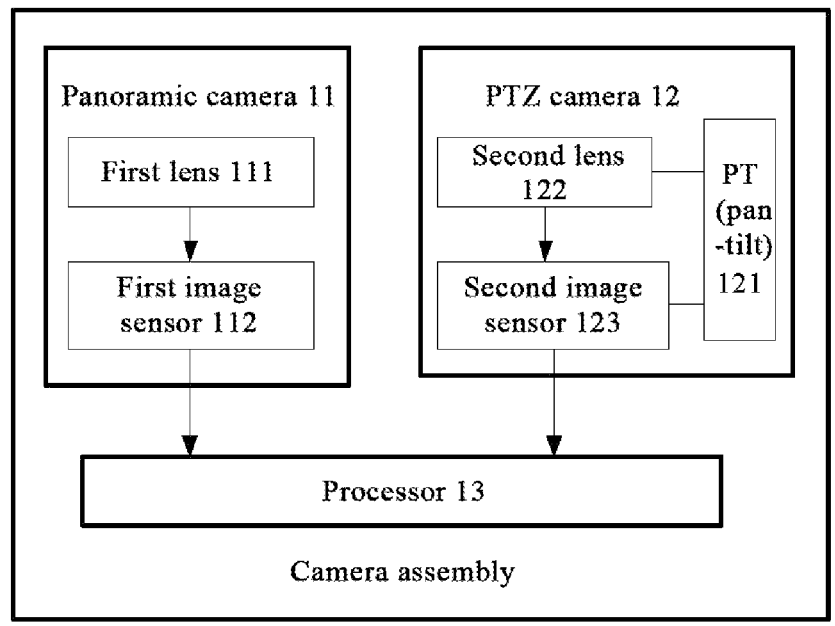
FIG. 1 is a schematic structure diagram of a camera assembly embodiment according to an embodiment of the present application.

In order to make objectives, technical solutions and advantages of the present application more apparent, the present application now will be described in detail with reference to the accompanying drawings and the detailed description. Obviously, the embodiments described are only some of the embodiments of the present application instead of all the embodiments. All further embodiments obtained by those of ordinary skills in the art based on the embodiments herein without any creative efforts are within the scope of the present application.

The following explains some of the terms in the embodiments of the present application to facilitate the understanding of those skilled in the art.

Panoramic camera: in the embodiments of the present application, it specifically refers to a wide-angle camera that can independently realize large-scale monitoring, and in general, the field angle of the panoramic camera is between 100 and 200 degrees.

PTZ camera: also known as high-speed dome camera, PTZ is the abbreviation of Pan/Tilt/Zoom in security monitoring applications, which represents the omni-directional (left and right/up and down) movement of the pan/tilt, and zoom and zooming control of the lens.

Association label: in the embodiments of the present application, it specifically refers to the camera automatically generating, according to a polygon frame labelled by the user in the panoramic camera picture, a label rule corresponding to the polygon frame in the PTZ camera picture (this rule specifically refers to the focus label rule); wherein, the panoramic camera picture refers to the picture captured by the panoramic camera, and the PTZ camera image refers to the picture captured by the PTZ camera.

Focus label: in the embodiments of the present application, in order to ensure the fast focus effect of the PTZ camera, the user selects several feature points or a feature line segment in the monitoring capture picture as a mark to meet the subsequent fast focus needs in the fast capture process.

Focus: it refers to make the camera focus the lens on a captured object through some methods, so that the captured object is clear.

Panoramic PTZ camera: also known as a panoramic gaze camera system, it is a combination of a panoramic camera and a PTZ camera, it has the advantages of a global wide angle of a panoramic camera and the advantages of a local close-up gaze of PTZ camera, and it is a high-definition network camera. Therefore, the panoramic PTZ camera has the comprehensive advantage of "seeing both broadly and clearly".

The following briefly introduces the application scenes of the present application.

The panoramic camera can realize the function of panoramic monitoring of a certain omnidirectional space, that is to say, the overall situation of a certain omnidirectional space can be seen in the panoramic camera picture. However, due to the characteristics of the panoramic camera itself, the field of view is too large, and the limited pixel resolution of the camera will reduce the detail resolution of the panoramic camera. The user cannot view a target monitoring area in the panoramic camera picture in detail. At this time, the panoramic camera can be combined with the PTZ camera, the PTZ camera is used to take a more detailed shot of the target monitoring area to obtain a high-resolution image of the target monitoring area.

Therefore, in the field of security monitoring, as integrated devices, the panoramic camera and the PTZ camera are presented to users in more and more forms. Such integrated devices are generally used in smart capture scenes such as face capture and vehicle capture, etc. In these usage scenes, there is generally a need to calibrate the panoramic camera picture and use the PTZ camera for smart capture, that is, mark the target area that needs to be captured in the panoramic camera picture with a line segment polygon frame, and then start the PTZ camera lens to perform operations such as intelligent capture of the target area.

For the above problems, the embodiments of the present application provides a camera assembly and a monitoring camera, wherein the camera assembly includes: a panoramic camera, a PTZ camera, and a processor. The panoramic camera includes a first lens and a first image sensor, and the panoramic camera is used to collect wide-angle images of a monitoring scene; the PTZ camera includes a PT pan/tilt, a second lens which is a zoom lens and a second image sensor, the PTZ camera is used to collect narrow-angle images in different directions of the monitoring scene, a visual field angle range of the wide-angle image is larger than a visual field angle range of the narrow-angle image; the processor is configured to superimpose, in response to an instruction input from outside, a polygon frame corresponding to the instruction on the wide-angle image; select, according to a preset mapping table of wide-angle image coordinates and narrow-angle image coordinates, at least two ordinate values in the polygon frame in the wide-angle image, and calculate at least two ordinate values on the narrow-angle image corresponding to the at least two ordinate values in the polygon frame in the wide-angle image; calculate an effective focus value interval of the PTZ camera based on the at least two ordinate values in the narrow-angle image, so that the PTZ camera performs a focusing operation within the effective focus value interval during a focusing process. In this technical solution, the camera assembly can automatically calculate the effective focus value interval of the PTZ camera according to the instruction input from outside without manual label, which improves the label accuracy of the PTZ focus label line segment, ensures that the PTZ camera only focuses within the effective focus value interval in the focusing process, and saves manpower and material resources.

The technical solution of the present application will be described in detail below through specific embodiments. It should be noted that the following specific embodiments can be combined with each other, and the same or similar concepts or processes may not be repeated in some embodiments.

FIG. 1 is a schematic structure diagram of a camera assembly embodiment according to an embodiment of the present application. As shown in FIG. 1, the camera assembly may include: a panoramic camera 11, a PTZ camera 12 and a processor 13.

Wherein, the panoramic camera 11 includes a first lens 111 and a first image sensor 112, and the panoramic camera is used to collect wide-angle images of a monitoring scene; that is, the panoramic camera 11 focuses on an object in the monitoring scene through the first lens 111 and collects a wide-angle image of the monitoring scene through the first image sensor 112.

The PTZ camera 12 includes a PT pan-tilt 121, a second lens 122, and a second image sensor 123. Wherein, the second lens 122 is a zoom lens, and the PTZ camera 12 is used to collect narrow-angle images in different directions of the aforementioned monitoring scene, and a visual field angle range of the wide-angle image is larger than a visual field angle range of the narrow-angle image.

The processor 13 is configured to: superimpose, in response to an instruction input from outside, a polygon frame corresponding to the instruction on the wide-angle image; select, according to a preset mapping table of wide-angle image coordinates and narrow-angle image coordinates, at least two ordinate values in the polygon frame in the wide-angle image, and calculate at least two ordinate values on the narrow-angle image corresponding to the at least two ordinate values in the polygon frame in the wide-angle image; calculate an effective focus value interval of the PTZ camera based on the at least two ordinate values in the narrow-angle image, so that the PTZ camera performs a focusing operation within the effective focus value interval during a focusing process.

The wide-angle image is also called a panoramic picture, a panoramic camera picture, a panoramic monitoring video, but it does not fully represent a real panoramic 360° viewing angle picture. The wide-angle image in the present application can be a picture with a large field angle, that is, a picture with a large horizontal field angle and a large vertical field angle, for example, the field angle of the panoramic lens collecting wide-angle images in the global face capture camera is 54° horizontally and 27° vertically.

The wide-angle image in this embodiment is not limited to a field picture with a larger field angle that is collected and stitched by multiple panoramic cameras. For example, Eagle Eye product is a full 360° panoramic image in the true sense (this refers to the horizontal viewing angle of 360°).

In this embodiment, the narrow-angle image is the image under the field angle of the PTZ camera, which is also called PTZ camera picture or PTZ monitoring video. Normally, it is: 32° horizontally, 18° vertically, in some scenes, the narrow-angle image is called a detailed image, that is, a picture with a small field of view, that is, a picture with a small horizontal field of view and a small vertical field of view.

In practical applications, the field angle of the panoramic camera is 54° horizontally and 27° vertically, and the actual area corresponding to the wide-angle image collected by the panoramic camera can be fixed. The field angle of the PTZ camera is 32° horizontally and 18° vertically, and the PTZ picture corresponding to the PTZ camera can be rotated 180° horizontally and 44° vertically. Generally, the area corresponding to the panoramic camera in this embodiment can cover the narrow-angle field of view area corresponding to the PTZ camera. That is, in this embodiment, the visible field angle range of the wide-angle image is larger than the visible field angle range of the narrow-angle image.

In this embodiment, the processor 13 can obtain an instruction input from the outside and respond to the instruction. For example, the user can mark a polygon frame on a wide-angle image, and the instruction includes position information of the polygon frame for trigger the focus of the PTZ camera. When the instruction includes the polygon frame input by the user, the processor 13 may superimpose the polygon frame corresponding to the instruction on the wide-angle image; select two ordinate values on the polygon frame; calculate, based on the mapping table of wide-angle image coordinates and narrow-angle image coordinates stored or acquired in the processor, at least two ordinate values mapped in the narrow-angle image; and calculate, based on the at least two ordinate values, an effective focus value interval of the PTZ camera, so that the PTZ camera can only perform focusing operation within the effective focus value interval, thereby achieving the effect of rapid focusing.

In this embodiment, after the effective focus value interval of the PTZ camera is obtained based on the instruction input from the outside, the effective focus value interval of the PTZ camera and the PTZ coordinate information can be used to establish a spatial object distance model, which can be used to ensure the focus value of the PTZ camera at any PTZ position within the polygon frame of the corresponding wide-angle image to achieve a fast focusing effect.

Exemplarily, in a possible design of this embodiment, the aforementioned processor 13 is configured to select at least two ordinate values on a polygonal frame in a wide-angle image, including:

the processor 13 is configured to determine an upper side length and a lower side length of the polygon frame in the longitudinal direction, and obtain an ordinate value of at least one point in the upper side length and an ordinate value of at least one point in the lower side length.

Optionally, in this embodiment, the processor 13 can calculate a longitudinal line segment that can roughly divide the polygon frame horizontally. Normally, if the longitudinal coordinate value is selected on the polygon frame, the ordinate value is two. Optionally, the processor 13 may determine the longitudinal upper side length and the lower side length based on the ordinate values of all the vertices of the polygon frame, and the ordinate values of the two vertices on the upper side are the largest two of the ordinate values of all the vertices, the ordinate values of the two vertices on the lower side are the smallest two of the ordinate values of all the vertices. Therefore, in this embodiment, the at least two ordinate values selected by the processor 13 on the polygon frame in the wide-angle image may include an ordinate value of at least one point in the upper side length and an ordinate value of at least one point in the lower side length.

Optionally, in this embodiment, the ordinate value of the midpoint of the line segment formed by the coordinate points corresponding to the two ordinate values can also be solved. It can be understood that the midpoint is not on the above-mentioned polygonal frame, but is within the polygonal frame.

Exemplarily, in this embodiment, the processor 13 is configured to obtain the ordinate value of at least one point in the upper side length and the ordinate value of at least one point in the lower side length, including:

the processor 13, configured to calculate the ordinate value and the abscissa value of the midpoint of the upper side length and the midpoint of the lower side length respectively.

Optionally, in this embodiment, after the processor 13 determines the upper side length and the lower side length of the polygon frame in the longitudinal direction, the ordinate value and abscissa value of the midpoint of the upper side length may be calculated by using the coordinate values (the ordinate value and the abscissa value) of the two vertices of the upper side length, and the coordinate values (the ordinate value and the abscissa value) of the two vertices of the lower side length may be used to calculate the ordinate value and the abscissa value of the midpoint of the lower side length. Therefore, in this embodiment, the ordinate value of at least one point in the upper side length and the ordinate value of at least one point in the lower side length acquired by the processor 13 may include the ordinate value of the midpoint of the upper side length and the ordinate value of the midpoint of the lower side length.

The coordinates in the wide-angle image can be changed to the coordinate system of the narrow-angle image according to the preset mapping table of wide-angle image coordinates and narrow-angle image coordinates. Exemplarily, in this embodiment, the processor 13 is further configured to: calculate, according to a preset mapping table of wide-angle image coordinates and narrow-angle image coordinates, respectively the coordinate value and abscissa value of the midpoint of the upper side length and the midpoint of the lower side length, to obtain the corresponding ordinate values and abscissa values on the narrow-angle image; the line segment determined by the corresponding ordinate values and abscissa values is superimposed on the narrow-angle image, to show the effective focus value interval of the PTZ camera.

In this embodiment, the processor 13 can determine the effective focus value interval in the PTZ camera based on the ordinate value and abscissa value of the midpoint of the upper side length and the midpoint of the lower side length. Therefore, in this embodiment, the processor 13 can calculate the ordinate value and abscissa value of the midpoint of the upper side length and the midpoint of the lower side length according to the preset mapping table of wide-angle image coordinates and narrow-angle image coordinates, to obtain the ordinate values and abscissa values corresponding to the midpoint of the upper side length and the midpoint of the lower side length on the narrow-angle image; that is, the midpoint of the upper side length and the midpoint of the lower side length can be mapped to two points on the narrow-angle image, the line segment composed of the two points is superimposed on the narrow-angle image, then the effective focus value interval of the PTZ camera can be showed.

Exemplarily, the processor 13 may generate a line segment composed of two longitudinal coordinates according to the polygon frame superimposed on the wide-angle image, and then find the midpoint of this line segment, that is, a line segment composed of 3 points is generated in the wide-angle image (two longitudinal coordinate points and a midpoint), and then convert these three coordinate points in the wide-angle image into 3 coordinate points in the corresponding narrow-angle image through the preset mapping table of wide-angle image coordinates and narrow-angle image coordinates, turn the second lens of the PTZ camera to the PT position corresponding to the midpoint of the line segment, and then calculate PT coordinates corresponding to the PTZ camera based on the two vertices of this line segment, and the line connecting the corresponding points of these three coordinates is the effective focus value interval of PTZ camera.

Further, in this embodiment, the aforementioned processor 13 is configured to perform the operation of selecting at least two ordinate values on a polygonal frame in a wide-angle image, including:

the processor 13 is also configured to: determine all vertices of the polygon frame; determine, according to ordinate values of all the vertices, the two vertices with the largest ordinate value and the two vertices with the smallest ordinate value; determining a first line segment according to the two vertices with the largest ordinate value and determine a second line segment according to the two vertices with the smallest ordinate value, and calculate the ordinate value of the midpoint of the first line segment and the ordinate value of the midpoint of the second line segment.

Specifically, the first line segment may be determined by using the two vertices with the largest ordinate value as endpoints, and the second line segment may be determined by using the two vertices with the smallest ordinate value as the endpoints. For example, in this embodiment, when the polygon frame corresponding to an external input instruction is a quadrilateral polygon frame ABCD, the ordinate values of all vertices can be obtained based on each of vertices of the polygon frame ABCD, that is, S={y1, y2, y3, y4}, two points corresponding to the two largest ordinate values and the two points corresponding to the two smallest ordinate values are found in S, for example, the points corresponding to the two largest ordinate values in S are A and B, then A is connected to B, and AB is the first line segment. Similarly, the two points corresponding to the smallest ordinate value in S are C and D, and then C is connected to D, and CD is the second line segment. Correspondingly, the ordinate value of the midpoint of the first line segment and the ordinate value of the midpoint of the second line segment are calculated to select at least two ordinate values on the polygon frame in the wide-angle image.

The camera assembly provided by the embodiments of the present application includes: a panoramic camera, a PTZ camera, and a processor. The panoramic camera is used to collect wide-angle images of a monitoring scene; the PTZ camera is used to collect narrow-angle images in different directions of the monitoring scene, a visual field angle range of the wide-angle images is larger than a visual field angle range of the narrow-angle images; the processor is configured to superimpose, in response to an instruction input from outside, a polygon frame corresponding to the instruction on the wide-angle image; select, according to a preset mapping table of wide-angle image coordinates and narrow-angle image coordinates, at least two ordinate values on the polygon frame in the wide-angle image, and calculate at least two ordinate values, by mapping the at least two ordinate values in the polygon frame on the narrow-angle image; calculate an effective focus value interval of the PTZ camera based on at least two ordinate values in the narrow-angle image, so that the PTZ camera performs a focusing operation within the effective focus value interval during a focusing process. In this technical solution, the camera assembly can automatically calculate the effective focus value interval of the PTZ camera according to the instruction input from outside without manual label, which improves the label accuracy of the PTZ focus label line segment, ensures that the PTZ camera only focuses within the effective focus value interval in the focusing process, and saves manpower and material resources.

Figure 2:
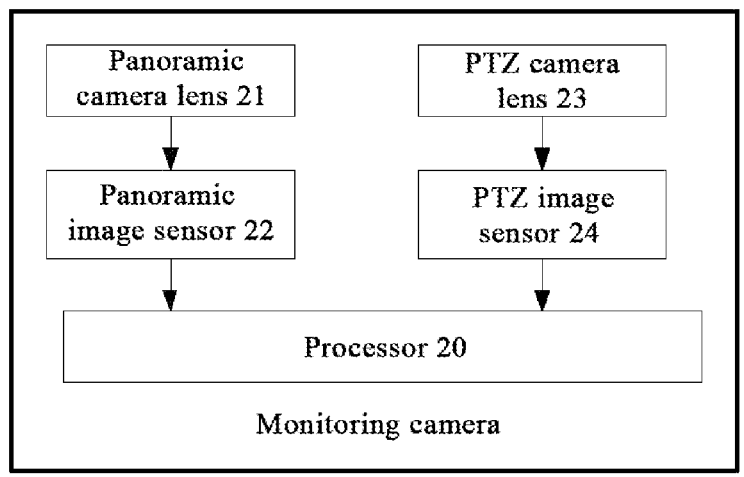
FIG. 2 is a schematic structure diagram of a monitoring camera embodiment according to an embodiment of the present application.

An embodiment of the present application also provides a monitoring camera. Refer to FIG. 2, which is a schematic structure diagram of a monitoring camera embodiment according to an embodiment of the present application. As shown in FIG. 2, the monitoring camera may include: a panoramic camera lens 21 and a panoramic image sensor 22 connected to each other, a PTZ camera lens 23 and a PTZ image sensor 24 connected to each other, and a processor 20 connected to both the panoramic image sensor 22 and the PTZ image sensor 24.

Wherein, the panoramic image sensor 22 is configured to collect a wide-angle image (also referred to as a panoramic camera picture) through the panoramic camera lens 21; the PTZ image sensor 24 is configured to collect a narrow-angle image (also referred to as a PTZ camera picture) through the PTZ camera lens 23.

The processor is configured to obtain the panoramic camera picture and the PTZ camera picture, and associate, according to an obtained label instruction, a panoramic focus label line segment in the panoramic camera picture to a same position in the PTZ camera picture. Optionally, the focus line segment formed in the PTZ camera picture is called an effective focus value interval of the PTZ camera lens 23, so that the monitoring camera can make the PTZ camera lens only perform focusing operation within the obtained effective focus value interval during the focusing process.

In the embodiment of the present application, the monitoring camera may specifically be a panoramic PTZ camera, which not only has the advantages of a global wide angle of a panoramic camera, but also has the advantages of a local close-up gaze of PTZ camera. The panoramic camera picture can also be called panoramic monitoring video, and the PTZ camera picture can also be called PTZ monitoring video.

In this embodiment, the panoramic image sensor 22 can collect a monitoring video within the field angle range of the panoramic camera lens 21, and the PTZ image sensor 24 can collect the monitoring video within the field angle range of the PTZ camera lens 23. Referring to FIG. 2, since the panoramic image sensor 22 and the PTZ image sensor 24 can be connected to the processor 20, respectively, the panoramic camera pictures collected by the panoramic image sensor 22 and the PTZ camera pictures collected by the PTZ image sensor 24 can both be transmitted to the processor 20 for processing.

Figure 3:
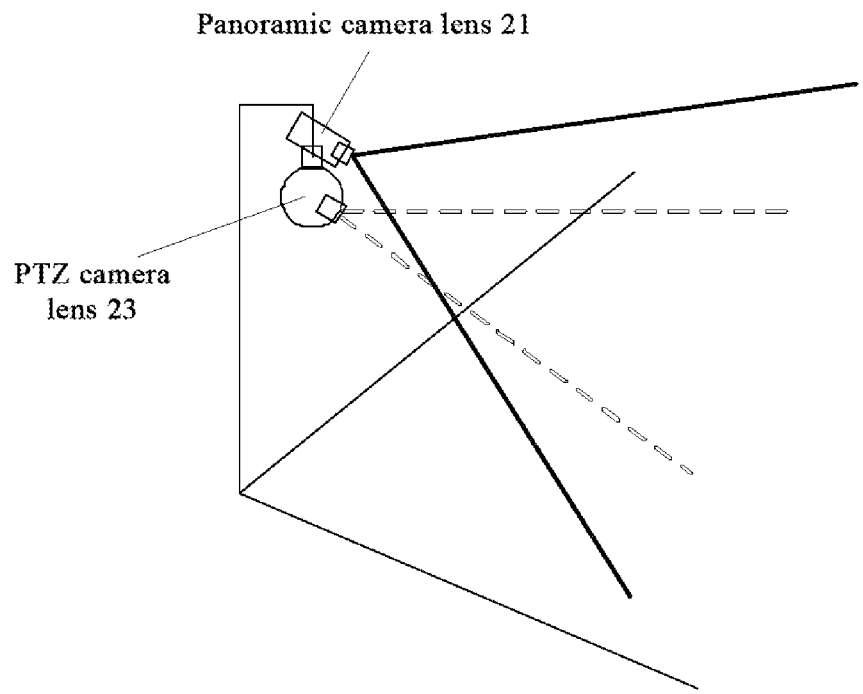
FIG. 3 is a schematic diagram of a model entity of a monitoring camera according to an embodiment of the present application.

Exemplarily, FIG. 3 is a schematic diagram of a model entity of a monitoring camera according to an embodiment of the present application. As shown in FIG. 3, the panoramic camera lens 21 and the PTZ camera lens 23 are integrally formed. It can be seen from the figure that the monitoring field angle of the panoramic camera lens 21 is much larger than that of the PTZ camera lens 23, wherein, the PTZ camera lens 23 can perform movement and zooming control operations in the omni-directional horizontal and vertical directions in space, while the panoramic camera lens 21 is fixed and cannot be moved or zoomed in space.

Figure 4:
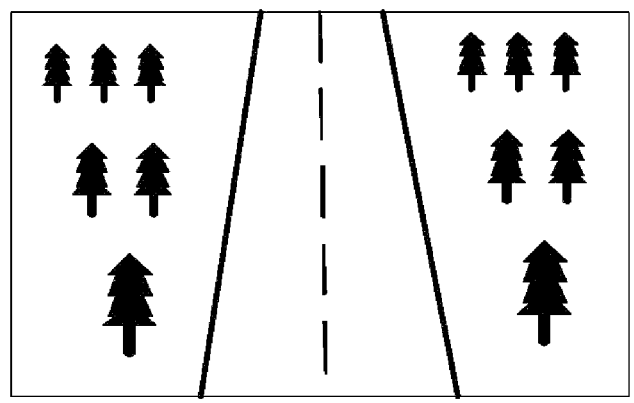
FIG. 4 is a schematic preview diagram of a panoramic camera picture corresponding to a panoramic camera image in an embodiment of the present application.
Figure 5:
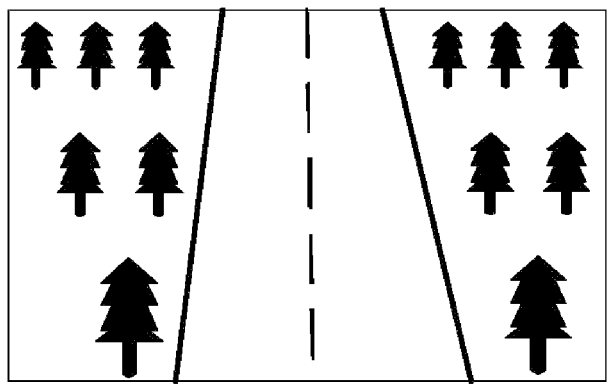
FIG. 5 is a schematic preview diagram of a PTZ camera picture corresponding to a PTZ camera picture in an embodiment of the present application.

Optionally, FIG. 4 is a schematic preview diagram of the panoramic camera picture corresponding to the panoramic camera picture in the embodiment of the present application, that is, the panoramic camera picture is the picture formed by the panoramic image sensor 22 collecting the image captured by the panoramic camera lens 21. FIG. 5 is a schematic preview diagram of a PTZ camera picture corresponding to a panoramic camera picture in an embodiment of the present application. Referring to FIG. 4 and FIG. 5, the actual scene range that can be observed in the panoramic camera picture of the monitoring camera is larger than that in the PTZ camera picture collected by the PTZ camera.

In this embodiment, when the user needs to focus on viewing an object in the panoramic camera picture, it can mark in the panoramic camera picture, for example, draw a marker box to determine a target monitoring area that the user needs to focus on. Furthermore, the processor 20 determines a panoramic focus label line segment of the target monitoring area, which lays a foundation for realizing the automatic synchronization of the label line segment in the panoramic camera picture and the PTZ camera picture.

Wherein, the processor 20 in this embodiment may be a general-purpose processor, including a CPU (Central Processing Unit), an NP (network processor), etc.; it may also be a DSP (Digital Signal Processing), ASIC (Application Specific Integrated Circuit), FPGA (Field-Programmable Gate Array) or other programmable logic devices, discrete gates or transistor logic devices, discrete hardware components. Regarding the specific expression form of the processor 20, this embodiment is not limited, and it can be determined according to actual situations.

Optionally, the processor 20 in the embodiment of the present application may specifically be a chip, which can process the panoramic camera picture collected by the panoramic camera lens 21 and/or the PTZ camera picture collected by the PTZ camera lens 23 to associate the panoramic focus label line segment in the panoramic camera picture to the same position in the PTZ camera picture, that is, associate the panoramic focus label line segment on the panoramic camera picture to the same position in the PTZ camera picture and generate the solution of the PTZ focus label line segment.

The monitoring camera provided by the embodiments of the present application includes a panoramic camera lens and a panoramic image sensor connected to each other, a PTZ camera lens and a PTZ image sensor connected to each other, and a processor connected to both the panoramic image sensor and the PTZ image sensor; the panoramic image sensor is configured to collect a panoramic camera picture through the panoramic camera lens; the PTZ image sensor is configured to collect a PTZ camera picture through the PTZ camera lens; the processor is configured to obtain the panoramic camera picture and the PTZ camera picture, and associate, according to an obtained label instruction, a panoramic focus label line segment in the panoramic camera picture to a same position in the PTZ camera picture, so that the PTZ camera lens only performs focusing operation within the effective focus value interval obtained during the focusing process without manual label, which not only improves the label accuracy of the PTZ focus label line segment, but also saves manpower and material resources.

Optionally, in the embodiment of the present application, the aforementioned processor 20 is further configured to:

transmit the panoramic camera picture and the PTZ camera picture to the display device connected to the monitoring camera for display;

obtain a label instruction issued by a user through the display device, wherein the label instruction is used to indicate a target monitoring area labelled in the panoramic camera area by the user;

determining the panoramic focus label line segment according to at least three key points of the target monitoring area, and the at least three key points are used to characterize the shape of the target monitoring area.

Exemplarily, in this embodiment, the display device may only present the panoramic camera picture based on the instruction issued by the user, or only present the PTZ camera picture, or simultaneously present the panoramic camera picture and the PTZ camera picture.

Wherein, when the display device presents the panoramic camera picture and the PTZ camera picture at the same time, the panoramic camera picture and the picture corresponding to the PTZ camera picture can be presented in a variety of ways such as a stacking method or a sub-regional method. Regarding the number of pictures displayed by the display device and the presentation mode during simultaneous presentation, both can be customized and selected according to actual situations, which is not limited in this embodiment.

Specifically, in this embodiment, when it is necessary to focus on the target monitoring area in the panoramic camera picture or capture objects in the panoramic camera picture, the user can calibrate a target monitoring area in the panoramic camera picture through a label instruction issued by the display device. Correspondingly, the processor 20 can obtain the label instruction and determine the target monitoring area.

Optionally, the target monitoring area may be a regular-shaped area or an irregular-shaped area, and the regular shape may be a polygon, a circle, or the like. The embodiment of the present application does not limit the shape of the target monitoring area.

Exemplarily, in order to accurately describe the target monitoring area, the target monitoring area may be characterized by a shape composed of at least 3 key points. Therefore, the processor may also determine at least three key points used to characterize the shape of the target monitoring area, and obtain a panoramic focus label line segment of the target monitoring area based on these at least three key points.

Exemplarily, in this embodiment, the processor 20 is configured to determine the panoramic focus label line segment according to at least three key points of the target monitoring area, which can be implemented by the following operations, that is, the processor 20 is specifically configured to:

determine, according to a vertical coordinate value (which is also the ordinate value) of each of the at least three key points, two key points with the largest ordinate value and two key points with the smallest ordinate value among the at least three key points;

obtaining a first line segment from the two key points with the largest ordinate value, and obtaining a second line segment from the two key points with the smallest ordinate value; specifically, the first line segment can be obtained by taking the two key points with the largest ordinate value as endpoints, the second line segment can be obtained by taking the two key points with the smallest ordinate value as the endpoints.

The midpoint of the first line segment and the midpoint of the second line segment are connected to obtain a panoramic focus label line segment of the target monitoring area.

In the embodiment of the present application, the panoramic monitoring video corresponds to the panoramic camera picture, and the PTZ monitoring video corresponds to the PTZ camera picture, each point in the panoramic camera picture and the PTZ camera picture can be represented by a coordinate point in the pixel coordinate system. Therefore, After the processor determines the target monitoring area labelled by the user on the panoramic camera picture, an ordinate value set can be obtained from the ordinate value of each of the at least three key points of the target monitoring area shape, and then the two key points with the largest ordinate value and the two key points with the smallest ordinate value can be found from the ordinate value set, a connection line between the two key points with the largest ordinate value is called the first line segment, and a connection line between the two key points with the smallest ordinate value is called the second line segment, the midpoint of the first line segment and the midpoint of the second line segment are connected by a line segment, and the obtained line segment is the panoramic focus label line segment of the target monitoring area.

Figure 6:
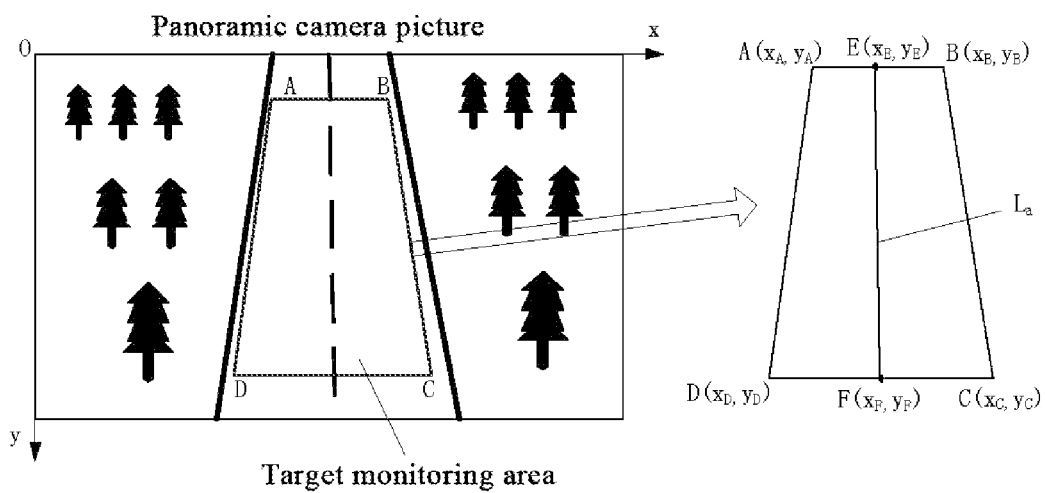
FIG. 6 is a schematic diagram of a target monitoring area labelled in the panoramic camera picture.

Exemplarily, FIG. 6 is a schematic diagram of a target monitoring area labelled in the panoramic camera picture. As shown in FIG. 6, the target monitoring area may be a quadrilateral polygon frame ABCD, which represents a monitoring capture area that the user pays attention to. In the panoramic camera screen shown in FIG. 6, assuming that a fixed point in the upper left corner of the panoramic camera picture is the coordinate origin O, the right direction of the top edge of the panoramic camera picture is the positive x-axis, and left downward direction of the panoramic camera picture is the positive y-axis.

Correspondingly, the coordinates of the four key points in the polygon frame ABCD in FIG. 6 are determined, for example, $A(x_A, y_A)$, $B(x_B, y_B)$, $C(x_C, y_C)$, $D(x_D, y_D)$, by traversing the vertical image coordinate value of each key point of the polygon frame ABCD, the ordinate value set $S=\{y_A, y_B, y_C, Y_D\}$ is obtained, and the two coordinates corresponding to the two largest values and the two coordinates corresponding to the two smallest values are found in S. According to the panoramic camera picture shown in FIG. 6, the coordinates of the two smallest values in S are A and B, and then connect A and B, that is, the line segment AB is the first line segment, and the coordinates of the two largest values in S are C and D, connect C and D, that is, line segment CD is the second line segment, and then find the midpoint $E(x_E, y_E)$ of line segment AB and the midpoint $F(x_F, y_F)$ of line segment CD, connect E and F, that is, line segment EF is the panoramic focus label line segment. In order to facilitate the subsequent description, in this embodiment, the panoramic focus label line segment EF is recorded as $La=\{(x_E, y_E),(x_E, y_E)\}$.

Further, in the embodiment of the present application, the PTZ focus label line segment in the PTZ camera picture can be automatically generated according to the panoramic focus label line segment $La=\{(x_E, y_E), (x_E, y_E)\}$. For the convenience of subsequent description, in the embodiment, the PTZ focus label line segment is denoted as Lb.

Optionally, based on the target monitoring area in the embodiment shown in FIG. 6, the process of the processor associating the panoramic focus label line segment in the panoramic camera picture to the same position in the PTZ camera picture according to the obtained label instruction is as follows.

The processor 20 is specifically configured to:

convert at least two panoramic pixel coordinate points on the panoramic focus label line segment into at least two PTZ coordinate points displayed in the PTZ camera picture through a preset mapping relationship;

convert, according to a geometric transformation relationship between PTZ coordinates and pixel coordinates, at least two PTZ coordinate points into at least two PTZ pixel coordinate points represented by the pixel coordinates;

obtain, according to at least two PTZ pixel coordinate points, a PTZ focus label line segment corresponding to the panoramic focus label line segment, and the coordinate positions of the PTZ focus label line segment and the panoramic focus label line segment are the same.

Exemplarily, in this embodiment, generally, at least two panoramic pixel coordinate points on the panoramic focus label line segment La can be determined. For example, if the number of panoramic pixel coordinate points on the panoramic focus label line segment La is two, then the two panoramic pixel coordinate points can be the two endpoints E and F of La, if the number of the panoramic pixel coordinate points on panoramic focus label line segment La is three, then the three panoramic pixel coordinate points can be the two endpoints E and F of La and the midpoint G of the line segment EF. If the number of panoramic pixel coordinate points on the panoramic focus label line segment La is four, then the four panoramic pixel coordinate points may be the two endpoints E and F of La and the two equal points on the line segment EF.

The embodiment of the present application does not limit the number of panoramic pixel coordinate points on the panoramic focus label line segment La. Generally, the panoramic pixel coordinate points that need to be obtained can be determined by evenly dividing the panoramic focus label line segment La.

Figure 7:
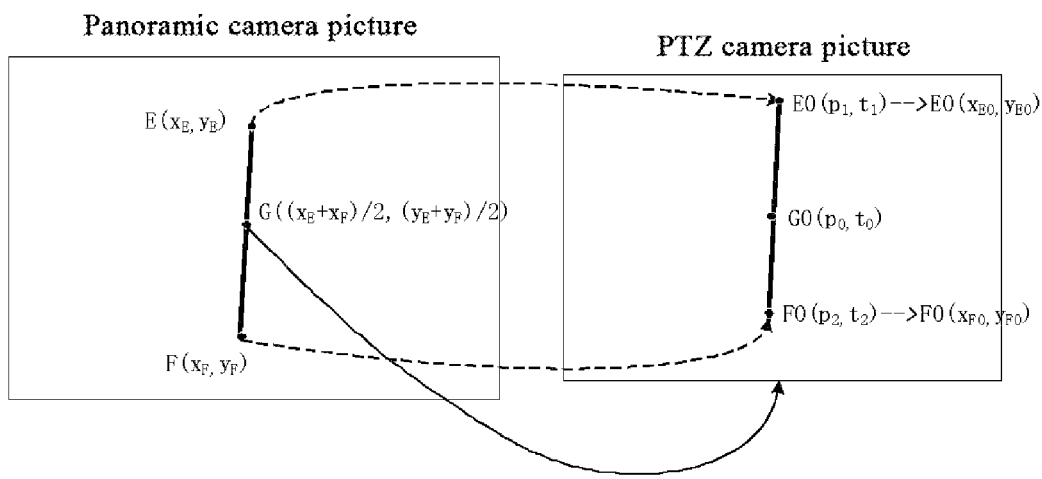
FIG. 7 is a schematic association diagram of a panoramic focus label line segment associated with a PTZ focus label line segment in a PTZ camera picture in an embodiment of the present application.

Exemplarily, FIG. 7 is a schematic association diagram of a panoramic focus label line segment associated with a PTZ focus label line segment in a PTZ camera picture in an embodiment of the present application. As shown in FIG. 7, if the three panoramic pixel coordinate points on the panoramic focus label line segment La are used to associate the PTZ focus label line segment, the midpoint G $((x_E+x_F)/2, (y_E+y_F)/2)$ of the panoramic focus label line segment La can be directly taken. Therefore, referring to FIG. 7, three panoramic pixel coordinate points on the panoramic focus label line segment La are:

$E=(x_E, y_E)$;

$F=(x_F, y_F)$;

$G=((x_E+x_F)/2, (y_E+y_F)/2)$;

$La=\{(x_E, y_E), (x_E, y_E)\}$.

In this embodiment, the processor may convert the three panoramic pixel coordinate points E, F, and G on the panoramic focus label line segment La into PTZ coordinate points in the PTZ camera picture based on a preset mapping relationship.

As an example, the preset mapping relationship represents a position mapping relationship between the panoramic pixel coordinate points and the PTZ coordinate points, and the preset mapping relationship may be represented by a homography matrix.

Specifically, the specific conversion between the panoramic pixel coordinate points and the PTZ coordinate points is completed by the matching label of the panoramic camera lens 21 and the PTZ camera lens 23. The process of matching and label is to establish the mapping relationship between the panoramic camera picture and the PTZ camera picture.

Optionally, the preset mapping relationship is a homography matrix H. For the convenience of subsequent description, the homography matrix H can be recorded as $$H = \begin{bmatrix} a & b & c \\ e & f & g \\ m & n & q \end{bmatrix},$$

where each parameter in the homography matrix H can be determined on the basis of actual conditions or on the basis of parameters after training.

In this embodiment, when the pixel coordinate $S(x, y)$ of a certain point S in the panoramic camera picture is known, the PT coordinate $V=(p,t)$ in the corresponding PTZ camera picture can be calculated through the homography matrix H. Wherein, $S(x, y)$ can be any one of the panoramic pixel coordinate points E, F, and G.

In this embodiment, the implementation of associating the panoramic focus label line segment on the panoramic camera picture to the same position in the PTZ camera picture and generating the PTZ focus label line segment is expressed in the form of a matrix as follows:

$$S = \begin{bmatrix} x \\ y \\ 1 \end{bmatrix}, V = \begin{bmatrix} p \\ t \\ 1 \end{bmatrix}, H = \begin{bmatrix} a & b & c \\ e & f & g \\ m & n & q \end{bmatrix};$$

Therefore, $\begin{bmatrix} x \\ y \\ 1 \end{bmatrix} = S = H \cdot V = \begin{bmatrix} a & b & c \\ e & f & g \\ m & n & q \end{bmatrix} \cdot \begin{bmatrix} p \\ t \\ 1 \end{bmatrix}$ In the same way, through the above preset mapping relationship, coordinates that the three panoramic pixel coordinates points E, F, and G in the panoramic camera picture mapped in the PTZ camera picture can be solved as PTZ coordinates E0, F0, G0, as shown in FIG. 7:

$$E = (x_E, y_E) \xrightarrow{H} E0 = (p_1, t_1)$$

$$G = ((x_E + x_F)/2, (y_E + y_F)/2) \xrightarrow{H} G0 = (p_0, t_0)$$

$$F = (x_F, y_F) \xrightarrow{H} F0 = (p_2, t_2)$$

Therefore, the line segment composed of the PTZ coordinates E0, F0, and $G_0$ is the PTZ focus label line segment represented by the PTZ coordinates.

If it is required to display the PTZ focus label line segment in the PTZ camera picture, it is necessary to convert the PTZ coordinate point into the PTZ pixel coordinate point expressed by the pixel coordinate through the geometric transformation relationship between the PTZ coordinate and the pixel coordinate. Specifically, the PTZ camera picture can be rotated to the $G0=(p_0, t_0)$ position, and then according to the relationship between the PTZ coordinates of $E0=(p_1, t_1)$, $F0=(p_2, t_2)$ and the PTZ coordinates of $G0=(p_0, t_0)$, the PTZ pixel coordinate points of the E0 and F0 points are calculated in the PTZ coordinate picture of G0 point, namely:

$$E0 = (p_1, t_1) \xrightarrow{F} E0 = (x_{E0}, y_{E0})$$

$$F0 = (p_2, t_2) \xrightarrow{F} F0 = (x_{F0}, y_{F0})$$

$$F(p, t) = (x_0, y_0).$$

Therefore, the line segment formed with the PTZ pixel coordinate points $E0(x_{E0}, y_{E0})$ and $F0(x_{F0}, y_{F0})$ as the endpoints is the PTZ focus label line segment.

Optionally, in this embodiment, the following briefly describes the PTZ coordinate system corresponding to the PTZ camera lens, that is, the related concepts of the PTZ space rectangular coordinate system.

Figure 8:
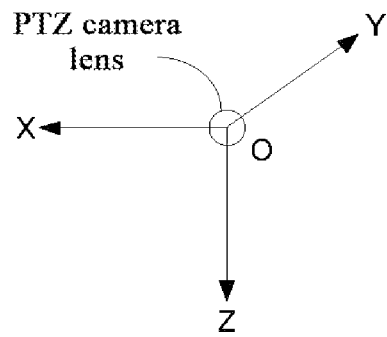
FIG. 8 is a schematic diagram of the spatial rectangular coordinate system of the PTZ camera picture.
Figure 9:
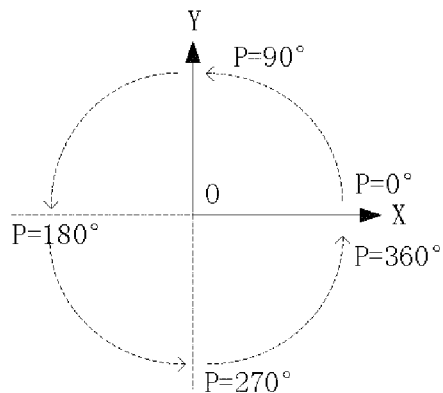
FIG. 9 is a schematic diagram of the XOY plane of FIG. 8.

Exemplarily, FIG. 8 is a schematic diagram of a spatial rectangular coordinate system of a PTZ camera picture. FIG. 9 is a schematic diagram of the XOY plane of FIG. 8. FIG.

Figure 10:
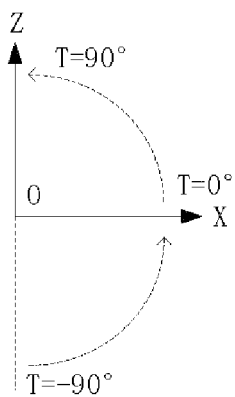
FIG. 10 is a schematic diagram of the XOZ plane of FIG. 8.

10 is a schematic diagram of the XOZ plane of FIG. 8. As shown in FIG. 8, taking the PTZ camera lens as a spherical camera lens as an example, the initial position of the PTZ camera lens is the original point O. As shown in FIG. 9, the schematic diagram of the XOY plane depicts a rectangular plane coordinate system formed by rotating a circle of a spherical camera lens at any vertical angle (except 90 degrees). It is specified that the positive direction of the X axis is the horizontal angle of 0 degrees, the negative direction of the X axis is a horizontal angle of 180 degrees, the positive direction of the Y axis is a horizontal angle of 90 degrees, and the negative direction of the Y axis is a horizontal angle of 270 degrees, the entire rectangular coordinate system can be divided into 360 degrees in the counterclockwise direction. As shown in FIG. 10, the schematic diagram of the XOZ plane depicts the rectangular plane coordinate system formed by rotating half a circle of a spherical camera at any horizontal angle. It is specified that the positive direction of the X axis is the vertical angle of 0 degrees, the positive direction of the Z axis is a vertical angle of 90 degrees, the negative direction of the Z axis is a vertical angle of −90 degrees, and the half rectangular plane coordinate system in the positive direction of the X axis is divided into 180 degrees according to the counterclockwise direction. It can be specified that the vertical angle of 0 degrees is any direction angle perpendicular to the central axis of the spherical camera and passes through the origin point O.

Therefore, in the embodiment of the present application, the PTZ coordinate point expressed by the spatial rectangular coordinate system can be converted into the PTZ pixel coordinate point expressed in the pixel coordinate system based on the geometric transformation relationship between the PTZ coordinate and the pixel coordinate.

Optionally, in the embodiment of the present application, the aforementioned processor 20 is further configured to:

control a focus center of the PTZ camera lens 23, so that the target PTZ camera picture collected by the PTZ image sensor 24 includes at least one key point in the PTZ focus label line segment.

Figure 11:
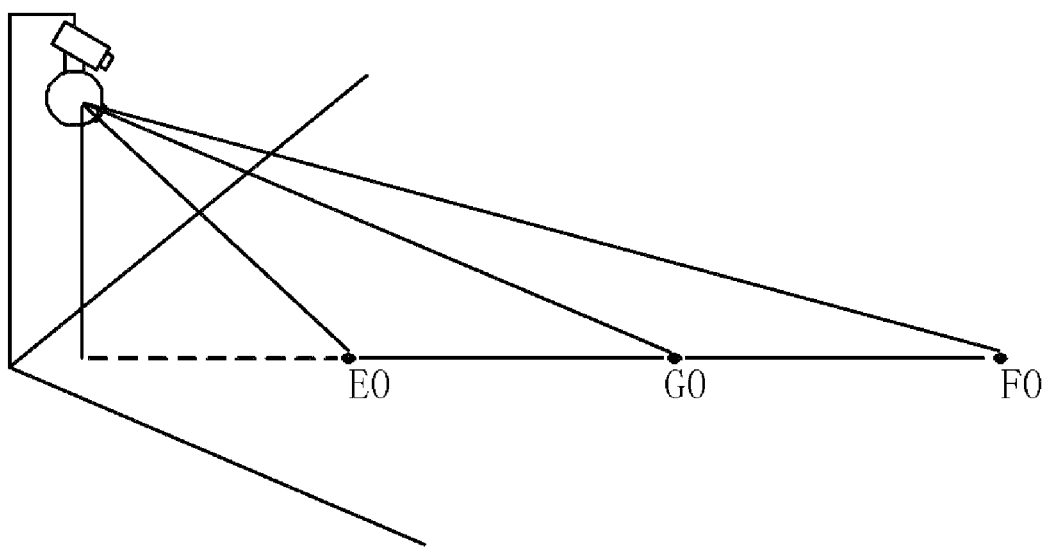
FIG. 11 is a schematic diagram of focus label of a PTZ camera lens in a monitoring camera.

In this embodiment, FIG. 11 is a schematic diagram of focus label of a PTZ camera lens in a monitoring camera. As shown in FIG. 11, the line segment E0F0 is the PTZ focus label line segment Lb in the PTZ camera picture. In this way, the monitoring camera can present the PTZ focus label line segment on the PTZ camera picture through the monitoring display.

Correspondingly, the monitoring camera can perform the label operation through the processor 20, that is, perform focus collection on the line segment Lb, specifically, focus on multiple key points in the PTZ focus label line segment as a focus center and collect the PTZ camera picture. In this way, the PTZ camera only performs the focusing operation within the effective focus value interval corresponding to the PTZ focus label line segment during the focusing process.

Further, in the schematic diagram shown in FIG. 11, the processor can also collect the focus data information of three points: E0=($x_{E0}$, $y_{E0}$)=($p_1$, $t_1$), F0=($x_{F0}$, $y_{F0}$)=($p_2$, $t_2$), and G0=($p_0$, $t_0$), and then a corresponding model is established according to the collected focus data information to provide guarantee for the subsequent fast automatic focusing.

The monitoring camera provided by the embodiment of the application can automatically generate the corresponding focus label line segment in the PTZ camera picture according to the target monitoring area labelled by the user in the panoramic camera picture, so as to solve the problems of complex operation, error prone, time-consuming, etc. caused by the manual label of the user in the prior art.

The embodiment of the present application also provides a monitoring system, including: a monitoring camera and a display device, and the display device includes a display screen. The monitoring camera in the monitoring system in the embodiment of the present application may be any camera assembly or monitoring camera in the foregoing embodiment.

As an example, the monitoring camera may be the camera assembly in the embodiment shown in FIG. 1. For the specific composition and implementation principle of the camera assembly, please refer to the loading in the embodiment in FIG. 1, which will not be repeated here.

As another example, the monitoring camera may be the monitoring camera in the embodiment shown in FIG. 2. For the specific composition and implementation principle of the monitoring camera, please refer to the loading in the embodiment in FIG. 2, which will not be repeated here.

Specifically, the monitoring camera is configured to: collect a panoramic camera picture and a PTZ camera picture, and transmit the panoramic camera picture and/or PTZ camera picture to a display device;

The display device is used to: receive the panoramic camera picture and/or PTZ camera picture, display the panoramic camera picture and/or PTZ camera picture through a display screen, and obtain a label instruction of the user, and transmit the label instruction to the monitoring camera;

the monitoring camera is also configured to: associating, according to the obtained label instruction, a panoramic focus label line segment in the panoramic camera picture to a same position in the PTZ camera picture.

In the embodiment of the present application, the display device is specifically configured to:

obtain the label instruction issued by the user, wherein the label instruction is used to indicate a target monitoring area labelled in the panoramic camera area by the user;

sending the label instruction to the monitoring camera;

the monitoring camera is also configured to:

determine the panoramic focus label line segment according to at least three key points of the target monitoring area, and the at least three key points are used to characterize the shape of the target monitoring area.

The embodiment of the present application also provides a method, a region of interest in a wide-angle image is focused and displayed in a PT camera picture, the method includes the following steps.

Step 1, obtaining at least 4 pixel points set by the user in a wide-angle image, and the at least 4 pixel points are used to indicate a region of interest of the user in the wide-angle image. The method of focusing and displaying the region of interest in the wide-angle image in the PT camera picture of the embodiment of the present application can be realized by the camera assembly and the monitoring camera. At least 4 pixel points are used to indicate the region of interest of the user in the wide-angle image. For example, at least 4 pixel points can form a polygon, and the area represented by the polygon is regarded as the region of interest of the user in the wide-angle image.

Step 2: obtaining the ordinate value of each of the at least four pixel points.

Step 3: grouping, according to the ordinate value of each pixel point, the at least four pixel points into groups each containing two pixel points.

Every two pixel points with the closest ordinate value can be divided into a group according to the ordinate value of each of the at least 4 pixel points. Four pixel points are taken as an example, in one possible implementation, four pixel points set by the user are obtained, and two pixel points whose ordinate values are adjacent among the four pixel points are grouped into a group. For example, as shown in FIGS. 6 and 7, AB is a group and CD is a group.

Step 4: obtaining an abscissa mean and an ordinate mean of two pixel points in any group.

The abscissa mean and ordinate mean of two pixel points in any group can be expressed as the midpoint of the two pixel points in the group.

Step 5: applying a weighting function to the abscissa means and the ordinate means of respective groups to calculate one weighted abscissa value and one weighted ordinate value.

In one possible implementation, the abscissa means and ordinate means of all groups are weighted by mean. Four pixel points are taken as an example, refer to the process of weighting E and F by mean to obtain G in the corresponding embodiment of FIG. 7.

Step 6: based on a preset coordinate mapping function between a wide-angle image and a PT camera picture, determining and displaying in a PT camera picture, all pixel points obtained by applying the coordinate mapping function to a pixel point corresponding to the abscissa mean and the ordinate mean of any group and a pixel point corresponding to the weighted abscissa value and the weighted ordinate value.

Step 7, driving a motor to move, based on all the determined pixel points and a preset PT mapping function between a PT camera picture and the motor in the PT camera used to collect the PT camera picture, so that the region of interest in the wide-angle image is focused and displayed in a newly collected PT camera picture.

For the conversion of coordinates between the wide-angle image and the PT camera picture, please refer to the corresponding embodiment in FIGS. 7-11, which will not be repeated here.

In the embodiment of the present application, the PT camera picture in the wide-angle image can be displayed according to at least 4 pixel points set by the user, which improves the label accuracy of PTZ focusing label line segment, ensures that the PTZ camera can only focus within the effective focus value interval in the focusing process, and saves manpower and material resources.

In this application, "at least one" refers to one or more, and "multiple" refers to two or more. "And/or" describes the association relationship of the associated object, indicating that there may be three relationships, for example, A and/or B. It can indicate that there is A alone, there are both A and B, and there is B alone, where A and B can be singular or plural. The character "/" generally indicates that the front and rear associated objects are an "or" relationship; In the formula, the character "/" indicates that the front and rear associated objects are a "division" relationship. "At least one of the following" or its similar expression refers to any combination of these items, including any combination of a single item or a plurality of items. For example, at least one of a, b, or c may represent: a, b, c, a-b, a-c, b-c, or a-b-c, wherein a, b, and c may be a single or multiple.

It can be understood that the various numerical numbers involved in the embodiments of the present application are only for the convenience of description and distinction, and do not need to limit the scope of the embodiments of the present application.

It can be understood that in the embodiment of the present application, the size of the sequence number of the above processes does not mean the execution order. The execution order of each process shall be determined according to its function and internal logic, and shall not constitute any limitation on the implementation process of the embodiment of the present application.

The above embodiments are only used to illustrate the technical solutions of the present application, not to limit it; although the present application has been described in detail with reference to the above embodiments, those skilled in the art should understand that they can still modify the technical solutions recorded in the above embodiments or make equivalent replacement for some or all of the technical features; these modifications or substitutions do not separate the essence of the corresponding technical solutions from the scope of the technical solutions of the embodiments of the present application.

What is claimed is:

1. A method for focusing and displaying a region of interest located in a wide-angle image, the method comprises:
    obtaining at least 4 pixel points set by a user in a wide-angle image, and the at least 4 pixel points are used to indicate a region of interest of the user in the wide-angle image;
    obtaining an ordinate value of each of the at least four pixel points;
    grouping, according to the ordinate value of each pixel point, the at least four pixel points into groups each containing two pixel points;
    obtaining an abscissa mean and an ordinate mean of two pixel points in any group;
    applying a weighting function to the abscissa means and the ordinate means of respective groups to calculate one weighted abscissa value and one weighted ordinate value;
    based on a preset coordinate mapping function between a wide-angle image and a Pan-Tilt (PT) camera picture, determining and displaying in the PT camera picture, all pixel points obtained by applying the coordinate mapping function to a pixel point corresponding to the abscissa mean and the ordinate mean of any group and a pixel point corresponding to the weighted abscissa value and the weighted ordinate value;
    driving a motor in a Pan-Tilt (PT) camera used to collect the PT camera picture to move, based on all the determined pixel points and a preset Pan-Tilt (PT) mapping function between the PT camera picture and the motor, so that the region of interest in the wide-angle image is focused and displayed in a newly collected PT camera picture.

2. The method of claim 1, wherein four pixel points set by the user are obtained, and two pixel points whose ordinate values are adjacent among the four pixel points are grouped into a group.

3. The method of claim 2, wherein the abscissa means and the ordinate means of all groups are weighted by mean.

4. A camera assembly, comprising:
    a panoramic camera, comprising a first lens and a first image sensor, the panoramic camera is used to collect wide-angle images of a monitoring scene;
    a Pan, Tilt, Zoom (PTZ) camera, comprising a Pan-Tilt (PT) pan-tilt, a second lens, and a second image sensor, the second lens is a zoom lens, the PTZ camera is used to collect narrow-angle images in different directions of the monitoring scene, a visual field angle range of the wide-angle image is larger than a visual field angle range of the narrow-angle image;

a processor, configured to:
  superimpose, in response to an instruction input from outside, a polygon frame corresponding to the instruction on the wide-angle image;
  select, according to a preset mapping table of wide-angle image coordinates and narrow-angle image coordinates, at least two ordinate values in the polygon frame in the wide-angle image, and calculate at least two ordinate values on the narrow-angle image corresponding to the at least two ordinate values in the polygon frame in the wide-angle image;
  calculate an effective focus value interval of the PTZ camera based on the at least two ordinate values in the narrow-angle image, so that the PTZ camera performs a focusing operation within the effective focus value interval during a focusing process.

5. The camera assembly of claim 4, wherein the processor is configured to select at least two ordinate values in the polygon frame in the wide-angle image, comprising:
  the processor is configured to determine an upper side length and a lower side length of the polygon frame in the longitudinal direction in the wide-angle image, and obtain an ordinate value of at least one point in the upper side length and an ordinate value of at least one point in the lower side length.

6. The camera assembly of claim 5, wherein the processor is configured to obtain the ordinate value of at least one point in the upper side length and the ordinate value of at least one point in the lower side length, comprising:
  the processor is configured to calculate an ordinate value and an abscissa value of a midpoint of the upper side length, and calculate an ordinate value and an abscissa value of a midpoint of the lower side length.

7. The camera assembly of claim 6, wherein the processor is further configured to:
  calculate, according to a preset mapping table of wide-angle image coordinates and narrow-angle image coordinates, respectively coordinate positions of the midpoint of the upper side length and the midpoint of the lower side length in the narrow-angle image, to obtain corresponding ordinate values and abscissa values on the narrow-angle image; superimpose a line segment determined by the corresponding ordinate values and the abscissa values, to show the effective focus value interval of the PTZ camera.

8. The camera assembly of claim 4, wherein the processor is configured to select at least two ordinate values in the polygon frame in the wide-angle image, comprising:
  the processor is specifically configured to: determine all vertices of the polygon frame in the wide-angle image; determine, according to ordinate values of all the vertices, two vertices with a largest ordinate value and two vertices with a smallest ordinate value; determining a first line segment according to the two vertices with the largest ordinate value and determine a second line segment according to the two vertices with the smallest ordinate value, and calculate an ordinate value of a midpoint of the first line segment and an ordinate value of a midpoint of the second line segment.

9. A monitoring camera, comprising a panoramic camera lens and a panoramic image sensor connected to each other, a Pan, Tilt, Zoom (PTZ) camera lens and a Pan, Tilt, Zoom (PTZ) image sensor connected to each other, and a processor connected to both the panoramic image sensor and the PTZ image sensor;
  the panoramic image sensor is used to collect a wide-angle image through the panoramic camera lens;
  the PTZ image sensor is used to collect a narrow-angle image through the PTZ camera lens;
  the processor is configured to obtain the wide-angle image and the narrow angle image, and associate, according to an obtained label instruction, a panoramic focus label line segment in the wide- angle image to a same position in the narrow-angle image.

10. The monitoring camera of claim 9, wherein the processor is also configured to:
  transmit the wide-angle image and the narrow-angle image to a display device connected to the monitoring camera for display;
  obtain a label instruction issued by a user through the display device, wherein the label instruction is used to indicate a target monitoring area labelled in the wide-angle image by the user;
  determine the panoramic focus label line segment according to at least three key points of the target monitoring area, and the at least three key points are used to characterize a shape of the target monitoring area.

11. The monitoring camera of claim 10, wherein the processor is specifically configured to:
  determine, according to an ordinate value of each of the at least three key points, two key points with a largest ordinate value and two key points with a smallest ordinate value among the at least three key points;
  obtaining a first line segment from the two key points with the largest ordinate value, and obtaining a second line segment from the two key points with the smallest ordinate value;
  connecting a midpoint of the first line segment and a midpoint of the second line segment, to obtain a panoramic focus label line segment of the target monitoring area.

12. The monitoring camera of claim 11, wherein the processor is specifically configured to:
  convert at least two panoramic pixel coordinate points on the panoramic focus label line segment into at least two PTZ coordinate points in the narrow-angle image through a preset mapping relationship, wherein the preset mapping relationship represents a position mapping relationship between the panoramic pixel coordinate points and the PTZ coordinate points;
  convert, according to a geometric transformation relationship between PTZ coordinates and pixel coordinates, at least two PTZ coordinate points into at least two PTZ pixel coordinate points represented by the pixel coordinates;
  obtain, according to at least two PTZ pixel coordinate points, a PTZ focus label line segment corresponding to the panoramic focus label line segment, and the PTZ focus label line segment and the panoramic focus label line segment have the same coordinate positions.

13. The monitoring camera of claim 10, wherein the processor is specifically configured to:
  convert at least two panoramic pixel coordinate points on the panoramic focus label line segment into at least two PTZ coordinate points in the narrow-angle image through a preset mapping relationship, wherein the preset mapping relationship represents a position mapping relationship between the panoramic pixel coordinate points and the PTZ coordinate points;
  convert, according to a geometric transformation relationship between PTZ coordinates and pixel coordinates, at least two PTZ coordinate points into at least two PTZ pixel coordinate points represented by the pixel coordinates;

obtain, according to at least two PTZ pixel coordinate points, a PTZ focus label line segment corresponding to the panoramic focus label line segment, and the PTZ focus label line segment and the panoramic focus label line segment have the same coordinate positions.

14. The monitoring camera of claim 9, wherein the processor is specifically configured to:

convert at least two panoramic pixel coordinate points on the panoramic focus label line segment into at least two PTZ coordinate points in the narrow-angle image through a preset mapping relationship, wherein the preset mapping relationship represents a position mapping relationship between the panoramic pixel coordinate points and the PTZ coordinate points;

convert, according to a geometric transformation relationship between PTZ coordinates and pixel coordinates, at least two PTZ coordinate points into at least two PTZ pixel coordinate points represented by the pixel coordinates;

obtain, according to at least two PTZ pixel coordinate points, a PTZ focus label line segment corresponding to the panoramic focus label line segment, and the PTZ focus label line segment and the panoramic focus label line segment have the same coordinate positions.

15. The monitoring camera of claim 14, wherein the preset mapping relationship is represented by a homography matrix.

16. The monitoring camera of claim 14, wherein the processor is also configured to:

control a focus center of the PTZ camera lens, so that a target narrow-angle image collected by the PTZ image sensor comprises at least one key point in the PTZ focus label line segment.

* * * * *